United States Patent [19]

Nakamura et al.

[11] 4,410,951
[45] Oct. 18, 1983

[54] POSITIONING APPARATUS

[75] Inventors: Takuma Nakamura; Kazumi Sugizaki, both of Kanagawa, Japan

[73] Assignee: VLSI Technology Research Association, Kanagawa, Japan

[21] Appl. No.: 403,963

[22] Filed: Aug. 2, 1982

Related U.S. Application Data

[63] Continuation of Ser. No. 167,080, Jul. 9, 1980, abandoned.

[30] Foreign Application Priority Data

Jul. 10, 1979 [JP] Japan ................................. 54-87626

[51] Int. Cl.³ ............................................. G05B 19/18
[52] U.S. Cl. .................................... 364/559; 364/167; 318/567
[58] Field of Search ................................ 364/559–561, 364/474, 142, 167, 170, 183, 174; 377/17, 24; 318/594, 600, 601, 608, 683, 567, 649

[56] References Cited

U.S. PATENT DOCUMENTS

| | | | |
|---|---|---|---|
| 3,617,751 | 11/1971 | Levy et al. | 250/201 |
| 3,676,650 | 7/1972 | Henegar | 318/601 |
| 3,683,345 | 8/1972 | Faulkes et al. | 318/608 |
| 3,752,969 | 8/1973 | Kiffmeyer et al. | 318/594 |
| 3,955,072 | 5/1976 | Johannsmeier | 364/559 |
| 4,130,786 | 12/1978 | Jacques | 318/608 |
| 4,131,838 | 12/1978 | Etoh et al. | 318/608 |
| 4,204,257 | 5/1980 | Hungerford | 364/474 |
| 4,221,998 | 9/1980 | Haught et al. | 318/608 |
| 4,225,928 | 9/1980 | Ohkubo | 364/167 |
| 4,245,297 | 1/1981 | Bertram | 364/167 |

OTHER PUBLICATIONS

"X-Ray Lithography" Nakayama et al., Published in Review of the Electrical Communication Laboratories, vol. 27, Numbers 1-2, Jan.-Feb. 1979, pp. 105-115.
"Progress in X-Ray Lithograph" McCoy et al., Published in Sixth Int. Conf. of Electron Beam & Ion Beam Science & Technology, 1974, pp. 3-22.

Primary Examiner—Gary Chin
Attorney, Agent, or Firm—Sughrue, Mion, Zinn, Macpeak & Seas

[57] ABSTRACT

A positioning apparatus employing a piezo worm type shifting mechanism in which the position of a platform to be moved to a desired position is measured with a position measuring device and data representing the position thus measured is applied to a microprocessor. The microprocessor calculates the phase of a voltage corresponding to the distance through which the platform should be moved to arrive at the desired position. The digital output is subjected to digital-to-analog conversion and a pulsive voltage produced thereby the magnitude of which corresponds to the distance to be moved. The pulsive voltage is applied directly to expanding and contracting piezoelectric elements which move the platform. The platform is thereby positioned at the desired position at a high speed and with a high accuracy.

4 Claims, 6 Drawing Figures

POSITIONING APPARATUS

This is a continuation, of application Ser. No. 167,080, filed July 9, 1980, now abandoned.

BACKGROUND OF THE INVENTION

The present invention relates to a positioning apparatus such as may be used for aligning masks for processing of semiconductor devices.

In order to carry out a positioning operation over a wide range with high accuracy, it is necessary to use a precision position measuring device and a shifting mechanism having a large stroke which is capable of moving an extremely short distance. A piezoelectric worm type shifting mechanism (hereinafter referred to as "a piezo motor" when applicable) is a known mechanism of the latter type. The piezo motor can move an extremely short distance of the order of several angstroms while having a maximum stroke of several tens of millimeters. Such a piezo motor, as shown in FIGS. 1(a) and 1(b), includes cylindrical piezoelectric elements 11, 12 and 13. Upon application of a voltage to the piezoelectric elements 11 and 13, the piezoelectric elements 11 and 13 contract radially with respect to the longitudinal axes of the cylinders. On the other hand, upon application of a voltage to the piezoelectric elements 12, the piezoelectric elements 12 expand longitudinally.

The operating principles of the piezo motor is as follows. To move the piezo motor to the right as viewed in FIG. 1(a), first no voltage is applied to the clamping piezoelectric elements 11 so that the elements 11 are in a position in abutment with an external cylindrical body 15. Then, a voltage is applied to the clamping piezoelectric elements 13 causing them to contract and thus clamp a moving bar 14. Thereafter, a voltage is applied to the piezoelectric elements 12 and the voltage thus applied is increased stepwise and gradually so that the elements 12 expand longitudinally in a motor which moves the moving bar 14 to the right. When the voltage applied to the piezoelectric elements 12 has reached its allowable maximum value, the polarity of the voltage applied to the clamping piezoelectric elements 11 and 13 is reversed so that the piezoelectric elements 11 clamp the moving bar 14 as shown in FIG. 1(b). Under this condition, the voltage applied to the piezoelectric elements 12 is decreased stepwise so that the elements 12 contract longitudinally to therefore again move the moving bar 14 to the right. In a similar fashion, the piezo motor can be moved to the left by suitably controlling the voltages applied to the piezoelectric elements 11, 12 and 13.

A method of performing a positioning operation using the above-described piezo motor will be described with reference to FIG. 2.

FIG. 2 is a block diagram showing a conventional precise positioning apparatus using a piezo motor. A platform 22 is driven by a piezo motor 21 and the position of the platform 22 is measured with a position measuring device 23. The output data of the position measuring device 23 is applied to a microprocessor 25 which calculates a number of pulses corresponding to the distance through which the platform 22 should be moved to arrive at the desired position. A corresponding number of pulses are generated by a pulse generating circuit 27. The pulses are inputted to a counter 28 and then the output of the counter 28 applied to a D/A converter 29 to be subjected to D/A conversion to thereby generate a stair step waveform signal. The stair step waveform signal is applied through a control section 24 to drive the piezo motor 21.

For the discussion which follows, for purposes of illustration it is assumed that the piezo motor is so designed that the platform moves 0.006 μm per step of the stair step waveform, for instance. It is further assumed that when the position of the platform 22 is measured at a point 41 in FIG. 4 by the position measuring device 23, the platform 22 is 0.06 μm distant from the desired position. In this case, the microprocessor 25 carried out an operation, namely the division of the error distance 0.06 μm by the incremental step length 0.006 μm, and applies a stair step voltage corresponding to ten pulses to the piezo motor control section 24 as a result of which the piezo motor is driven by ten steps to move the platform 22. The position of the platform 22 is again measured at a point 42 indicated in FIG. 4. If, at this time, the platform 22 has been moved beyond the desired position by a distance of, for example, 0.024 μm, the driving direction of the piezo motor is reversed for four steps. That is, the position of the platform 22 is repeatedly measured and the piezo motor repeatedly driven according to the measurement results until the position of the platform 22 is within an allowable position range around the desired position.

The above-described conventional positioning method is disadvantageous in that in order to change the voltage stepwise, for instance, from the value at the point 41 to the value at the point 42 in FIG. 4, a period of time is required which is the product of the period of one step and the required number of steps, ten in the above-described case. That is, if the number of steps is increased, the period of time required for completion of the positioning operation is proportionally increased.

SUMMARY OF THE INVENTION

Accordingly, an object of the invention is to provide a novel positioning apparatus which achieves positioning operations at a high speed and with a high accuracy.

Another object of the invention is to provide a positioning apparatus which completes positioning operations in an extremely short time no matter how far away the desired position.

With a positioning apparatus according to the invention, data representing the position of a platform measured by a position measuring device is inputted to a microcomputer where the phase of voltage corresponding to a distance through which a platform should be moved to attain a desired position is calculated and a corresponding digital output provided. The digital output is subjected to digital-to-analog conversion and a pulsive voltage whose magnitude corresponds to the movement distance is applied directly to expanding and contracting piezoelectric elements whereby the platform is set to the desired position at high rate.

The nature, principle and utility of the invention will become more apparent from the following detailed description when read in conjunction with the accompanying drawings.

DESCRIPTION OF THE PREFERRED EMBODIMENTS

A preferred embodiment of a positioning apparatus constructed according to the invention will be described with reference to FIGS. 5 and 6.

Figure 5:
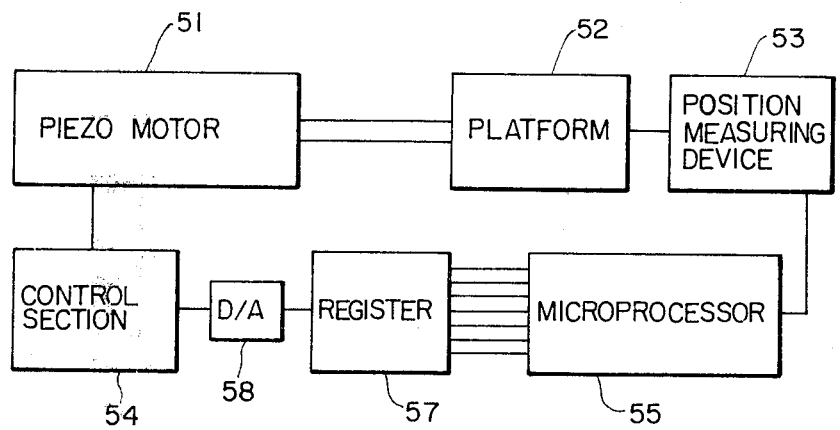
FIG. 5 is a block diagram showing the arrangement of a positioning apparatus constructed according to the present invention.

FIG. 5 is a block diagram showing an example of a precise positioning apparatus using a piezo motor according to the present invention. A platform 52 is driven by a piezo motor 51 and the position of the platform 52 is measured with a position measuring device 53. The output data of the position measuring device 53 is applied to a microprocessor 55 which calculates a voltage phase value corresponding to the distance through which the platform 52 should be moved to arrive at the desired position. A digital output representing the voltage phase value is loaded into a register 57 and then the registered data is applied to a D/A converter 58 where the data is subjected to D/A conversion to produce an analog voltage signal which is applied through a control section 54 to the piezo motor 51.

The position of the platform 52 is measured again, the measurement data is applied to the microprocessor 55 which again calculates the phase of voltage corresponding to the distance of movement then needed, and a digital value corresponding to the needed distance of movement is stored in the register 57 and is then converted into an analog voltage which is utilized to drive the piezo motor 51. The above-described operation is repeatedly carried out until the position of the platform 52 is within the allowable position range around the desired position.

Figure 6:
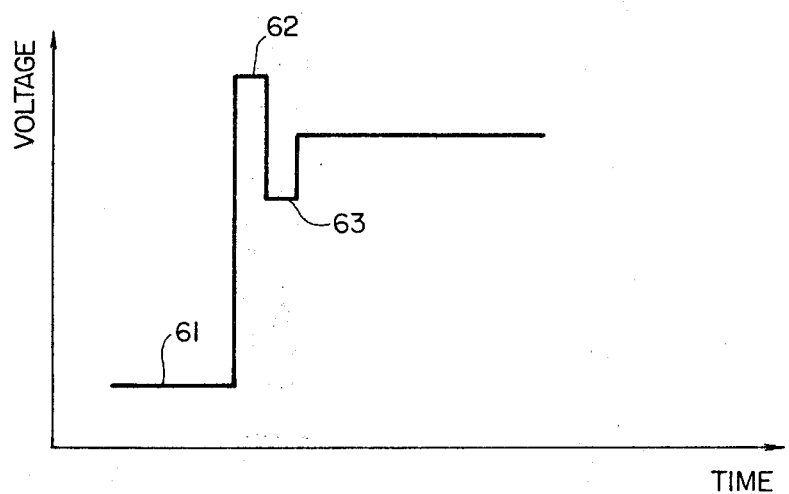
FIG. 6 is a waveform diagram showing a waveform of a voltage which is applied to the expanding and contracting piezoelectric elements in the positioning apparatus of the invention.

FIG. 6 shows the waveform of a voltage applied to the expanding and contracting piezoelectric element 12 by the positioning apparatus of the invention.

Figure 1A:
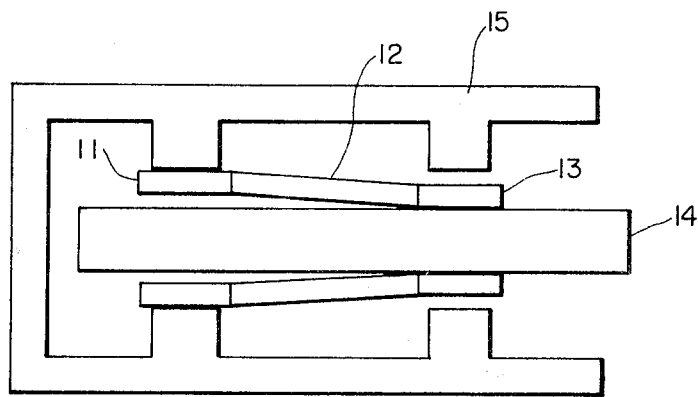
FIG. 1 is an explanatory diagram for a description of the operation of a piezoelectric element operated measuring worm type shifting mechanism.
Figure 1B:
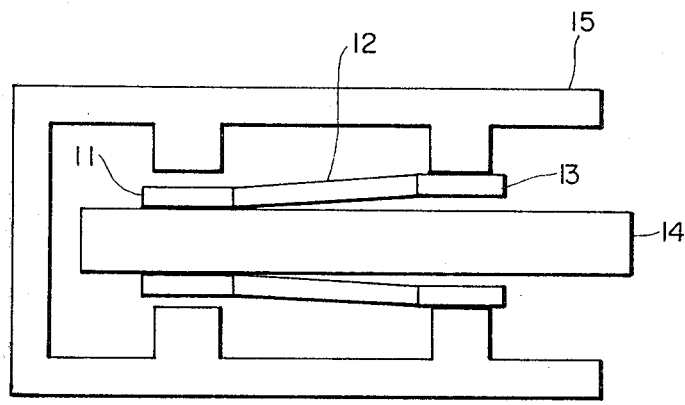
Figure 2:
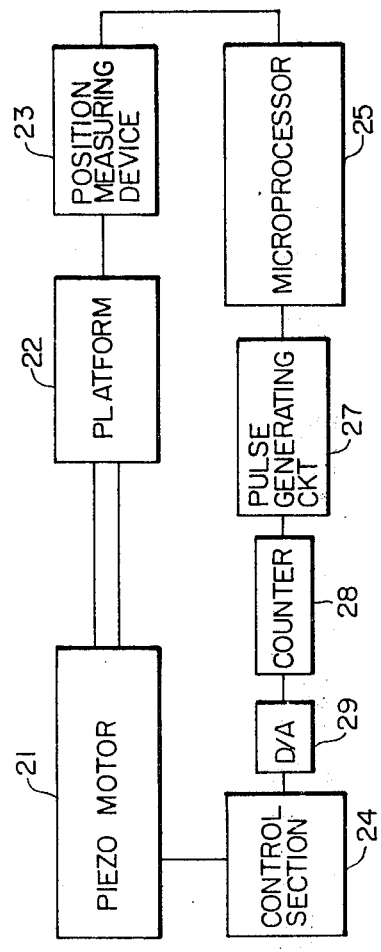
FIG. 2 is a block diagram showing a conventional precise positioning apparatus using a piezo motor.
Figure 3:
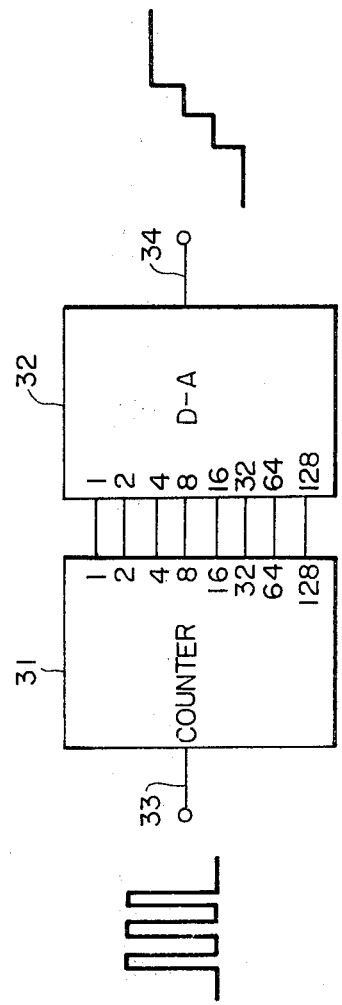
FIG. 3 is a block diagram showing a conventional voltage generating circuit for generating voltages to be applied to the expanding and contracting piezoelectric elements in the piezo motor.
Figure 4:
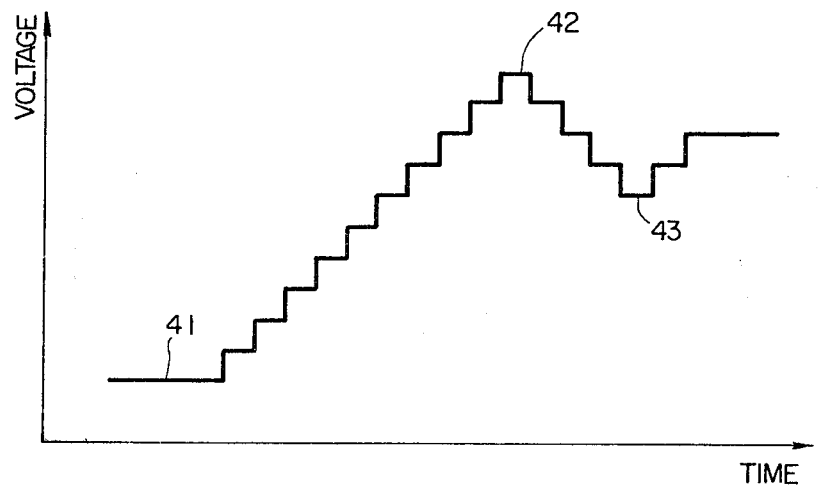
FIG. 4 is a waveform diagram indicating a waveform of a voltage which is applied to the expanding and contracting piezoelectric elements according to a conventional positioning method.

When the position of the platform 52 is measured at a point 61 and a voltage value in digital form is applied to the register 57 which is then subjected to digital-to-analog conversion, a pulsive voltage is generated having a level as indicated at a point 62. The point 62 corresponds to the point 42 in FIG. 4 in the conventional method. As is clear from comparing FIG. 6 and FIG. 4, while in the conventional method a period of time corresponding to ten steps is required to increase the voltage to the value at the point 42 corresponding to the point 62 in FIG. 6, with the invention, only a period of time corresponding to a single step is required to increase the voltage to the value at the point 62 corresponding to the point 42 in FIG. 4.

The position measurement, the calculation and the digital-to-analog conversion are repeatedly carried out until the platform has been properly positioned. The period of time required for each of the cyclically carried out positioning operations with the invention is much reduced compared with that needed with the conventional method.

A method for moving the platform through a distance corresponding to the maximum voltage, 500 V for instance, which may be applied to the piezoelectric elements 12 will next be described. The maximum voltage 500 V is divided into 256 increments or steps and the corresponding phase for each of the voltage increments, in ascending and descending order with respect to 0 V is stored in a memory in the microprocessor.

As an example, it is assumed that the voltage is increasing and its level corresponds to the hundredth phase counting from 0 V. Furthermore it is assumed that the position of the platform is measured as a result of which it is determined that the stage is 10 μm distant from the desired position. The distance 10 μm is longer than the distance (250−100)×0.006 μm=0.9 μm corresponding to the maximum voltage which may be applied to the expanding and contracting piezoelectric elements 12. To move the 10 μm distance, first the voltage phase 250 is read out of the microprocessor 55 and then stored in the register 57. This value thus stored is subjected to analog-to-digital conversion as a result of which the maximum allowable voltage of 500 V is applied to the expanding and contracting piezoelectric elements 12. Therefore, 0.9 μm is subtracted from 10 μm and the subtraction result is divided by 250×0.006 μm=1.5 μm. That is, (10 μm−0.9 μm)/1.5 μm=6+remainder 0.1.

The microprocessor issues an instruction signal for reversing the polarity of each of the voltages applied to the clamping piezoelectric elements 11 and 13 and causes a zero voltage to be applied to the expanding and contracting piezoelectric elements 12. Reversal of the polarity of each clamping voltage and alternatively applying 0 V or 500 V to the expanding and contracting piezoelectric elements 12 are carried out a total of six times. Finally, a value corresponding to the quotient obtained by dividing 0.1 μm by 0.006 μm is set in the register 57 and is subjected to digital-to-analog conversion as a result of which the piezo motor is driven to execute the final movement of the total needed 10 μm movement of the platform.

As is clear from the above description, a voltage corresponding to a required distance of movement is calculated and a voltage value to be applied to the expanding and contracting piezoelectric elements 12 is stored in digital form in the register 57 which is then subjected to digital-to-analog conversion. Accordingly, a suitable voltage is applied to the expanding and contracting piezoelectric elements in a short period of time so that the piezo motor is operated at a high speed thereby positioning the platform at a high rate.

Furthermore, the invention has been described by utilizing a method in which the position data is inputted into a microprocessor where it is processed with the voltage phase value being stored in the register 57. However, these operations can be carried out by mechanical means if desired.

If the positioning apparatus is applied to a device for aligning masks and wafers used in manufacturing semiconductor devices, then the alignment of masks and wafers can be achieved at a high rate and with a high accuracy which improves the throughput of the apparatus.

What is claimed is:

1. A positioning apparatus comprising:
shifting means both having a large stroke and being capable of moving an extremely short distance;
a platform coupled to be moved by said shifting means;
position measuring means for measuring the position of said platform;
calculating means receiving an output of said position measuring means for calculating an integer number of steps of a maximum step size and a fraction of said maximum step size for a single step through which said platform is to be moved to arrive at a desired position; and
control means for subjecting an output of said calculating means to digital-to-analog conversion to generate a pulsive signal the magnitude of which corresponds to said maximum step size for said integer number of steps and to said fraction of said step size for said single step for thereby controlling said shifting means to move said platform to said desired position in said integer number of steps of said maximum step size and a single step of said fraction of said maximum step size.

2. The apparatus as claimed in claim 1 wherein said shifting means comprises a piezo worm type shifting mechanism comprising expanding and contracting piezoelectric elements.

3. An apparatus as claimed in claim 1 wherein said control means comprises an analog voltage generating circuit comprising a register for storing a digital output of said calculating means and a digital-to-analog converter for converting said digital output into an analog voltage.

4. An apparatus as claimed in claim 1 wherein said calculating means comprises a microprocessor.

* * * * *